UNITED STATES PATENT OFFICE.

THOMAS B. OWENS, OF GATESVILLE, TEXAS.

IMPROVEMENT IN MEDICAL COMPOUNDS OR BITTERS FOR TREATING CHILLS AND FEVER.

Specification forming part of Letters Patent No. 139,185, dated May 20, 1873; application filed April 5, 1873.

*To all whom it may concern:*

Be it known that I, THOMAS B. OWENS, of Gatesville, in the county of Coryell and State of Texas, have invented a new and valuable Improvement in Medical Compounds; and I do hereby declare that the following is a full, clear, and exact description of the same.

This invention has relation to a "bitters" compound, which may be used as a medicine for the cure of chills and fevers; and it consists of the following ingredients, in the quantities named:

Take of dogwood-bark, wild-cherry bark, cinnamon-bark, calumba-root, gentian-root, orange-peel, nutmegs, cloves, red saunders, each one dram, and of alcohol, one gallon; water, one and a half gallon. Mix all together; macerate fourteen days, and filter the preparation, when the medicine will be ready for use.

The dose is usually for an adult a wineglassful three times a day. For chills and fever one table-spoonful may be taken every hour on the day of chill, commencing twelve hours before the time thereof, the system having been previously prepared by anti-bilious medicine.

What I claim as my invention, and desire to secure by Letters Patent, is—

The bitters compounded of the ingredients in the proportions substantially as specified.

In testimony that I claim the above I have hereunto subscribed my name in the presence of two witnesses.

T. B. OWENS.

Witnesses:
T. W. MABERRY,
Q. A. ELLIS.